(12) United States Patent
Heidan et al.

(10) Patent No.: US 10,040,340 B2
(45) Date of Patent: Aug. 7, 2018

(54) DRIVE SYSTEM FOR A MOVABLE ROOF PART OF A ROOF MODULE OF A MOTOR VEHICLE

(71) Applicant: BOS GMBH & CO. KG, Ostfildern (DE)

(72) Inventors: Michael Heidan, Stuttgart (DE); Hartmut Eberst, Schwäbisch Gmünd (DE)

(73) Assignee: BOS GMBH & CO. KG, Ostfildern (DE)

( * ) Notice: Subject to any disclaimer, the term of this patent is extended or adjusted under 35 U.S.C. 154(b) by 0 days.

(21) Appl. No.: 15/547,339

(22) PCT Filed: Jan. 25, 2016

(86) PCT No.: PCT/EP2016/051420
§ 371 (c)(1),
(2) Date: Jul. 28, 2017

(87) PCT Pub. No.: WO2016/120193
PCT Pub. Date: Aug. 4, 2016

(65) Prior Publication Data
US 2018/0009296 A1 Jan. 11, 2018

(30) Foreign Application Priority Data
Jan. 29, 2015 (DE) .......... 10 2015 201 587

(51) Int. Cl.
*B60J 7/057* (2006.01)
*B60J 7/02* (2006.01)
*B60J 7/043* (2006.01)

(52) U.S. Cl.
CPC .......... *B60J 7/057* (2013.01); *B60J 7/024* (2013.01); *B60J 7/0435* (2013.01)

(58) Field of Classification Search
CPC . B60J 7/0435; B60J 7/043; B60J 7/024; B60J 7/028; B60J 7/047; B60J 7/057; B60J 7/0573; B60J 7/053
(Continued)

(56) References Cited

U.S. PATENT DOCUMENTS 7,267,398 B2 * 9/2007 Van De Logt .......... B60J 7/02
296/216.08
7,784,859 B2 8/2010 Grimm et al.
(Continued)

FOREIGN PATENT DOCUMENTS

DE 10 2005 007 031 A1 8/2006
DE 10 2007 061 091 A1 6/2009
(Continued)

OTHER PUBLICATIONS

International Search Report issued in Application No. PCT/EP2016/051420 with English translation, dated May 6, 2016 (4 pages).
(Continued)

*Primary Examiner* — Dennis H Pedder
(74) *Attorney, Agent, or Firm* — Flynn, Thiel, Boutell & Tanis, P.C.

(57) ABSTRACT

A drive system including a guide rail arrangement fixed to a roof module, a drive slide, a front-side lifting arrangement, a rear-side extension mechanism, and a profiled support part. The lifting arrangement and the extension mechanism interact with the profiled support part such that the profiled support part is guided in a force-controlled manner between a closed, ventilating and open positions of the roof part. The coupling device end region remote from the extension mechanism has a coupling slide which is guided in the guide rail arrangement and which comprises a blocking element that can be moved in the vertical direction. A stationary latch recess is provided in the guide rail arrangement, and the
(Continued)

drive slide has a receiving area. Depending on the position of the drive slide, the blocking element is moved into the latch recess or into the receiving area in a force-controlled manner by mechanical control contours.

13 Claims, 14 Drawing Sheets

(58) Field of Classification Search
USPC ..... 296/216.02–216.05, 220.01, 224, 216.08
See application file for complete search history.

(56) References Cited

U.S. PATENT DOCUMENTS

| | | | |
|---|---|---|---|
| 7,802,400 B2* | 9/2010 | Biewer | B60J 7/02 296/216.08 |
| 8,616,623 B2* | 12/2013 | Sawada | B60J 7/024 296/216.03 |
| 9,376,000 B2 | 6/2016 | Heidan et al. | |
| 2009/0160223 A1 | 6/2009 | Grimm et al. | |
| 2015/0306942 A1 | 10/2015 | Heidan et al. | |

FOREIGN PATENT DOCUMENTS

| | | |
|---|---|---|
| DE | 10 2010 034 566 A1 | 2/2012 |
| DE | 10 2011 015 833 A1 | 10/2012 |
| WO | WO 2014/082920 A2 | 6/2014 |

OTHER PUBLICATIONS

Written Opinion of International Searching Authority issued in Application No. PCT/EP2016/051420 dated May 6, 2016 (5 pages).

\* cited by examiner

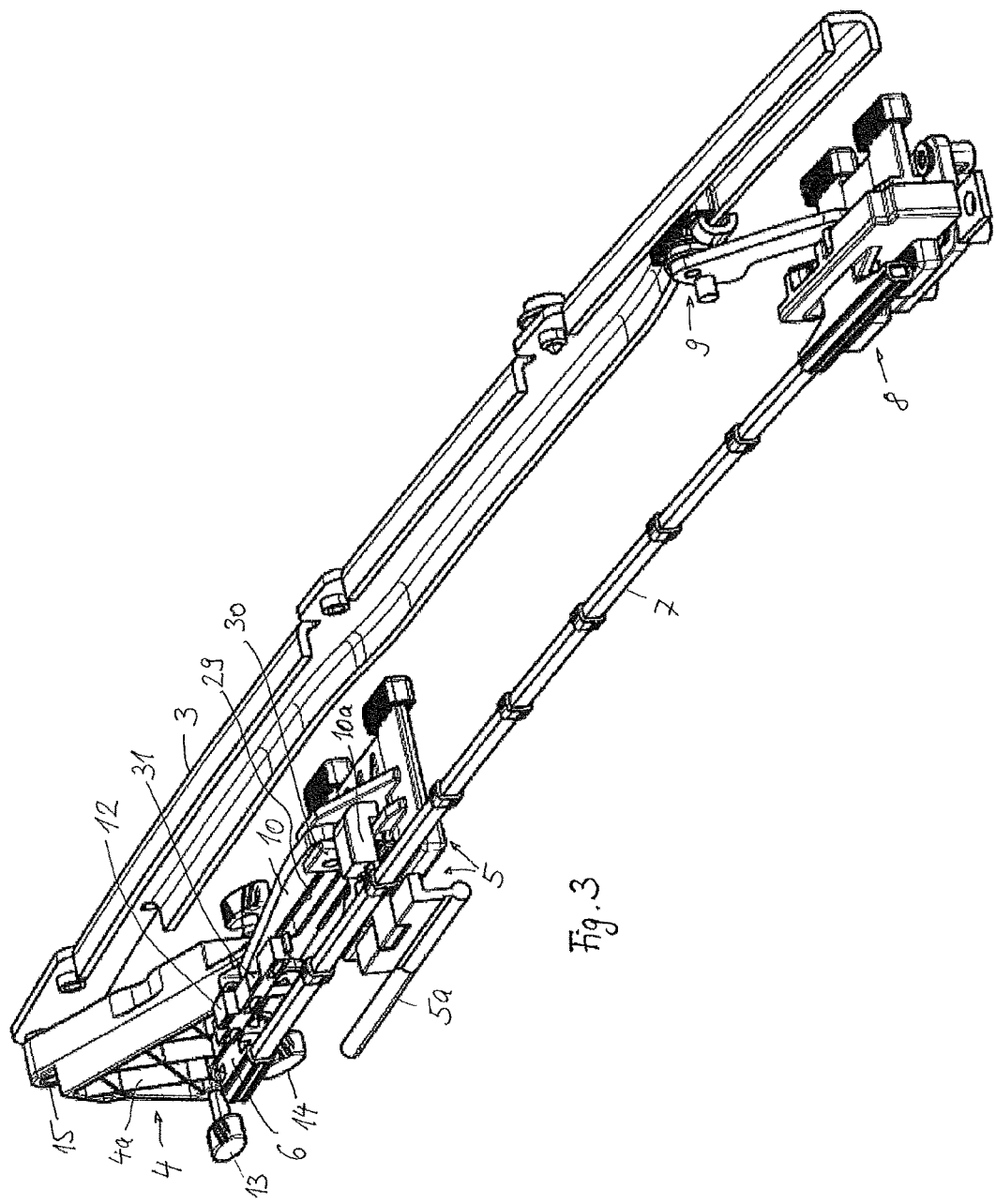

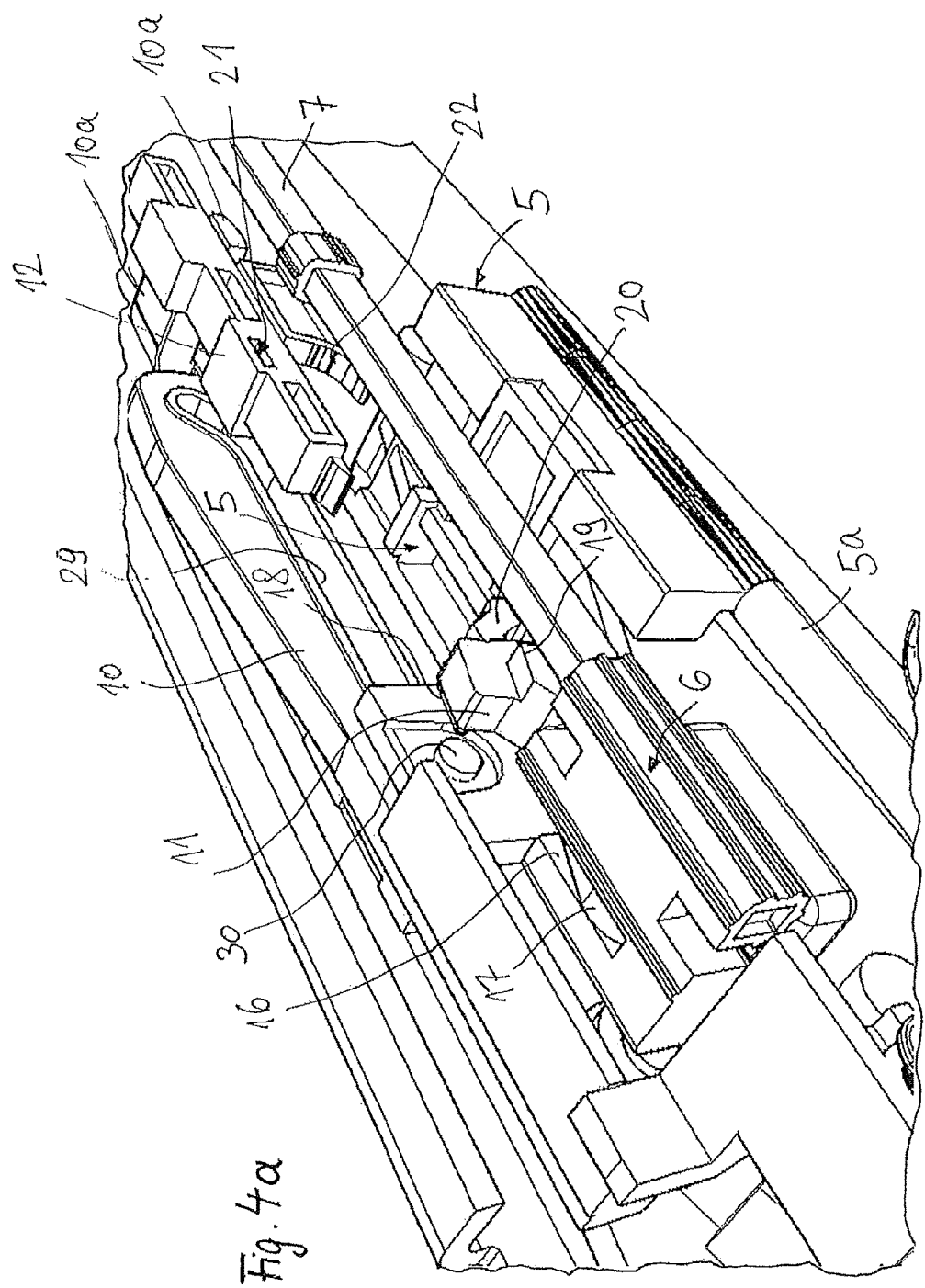

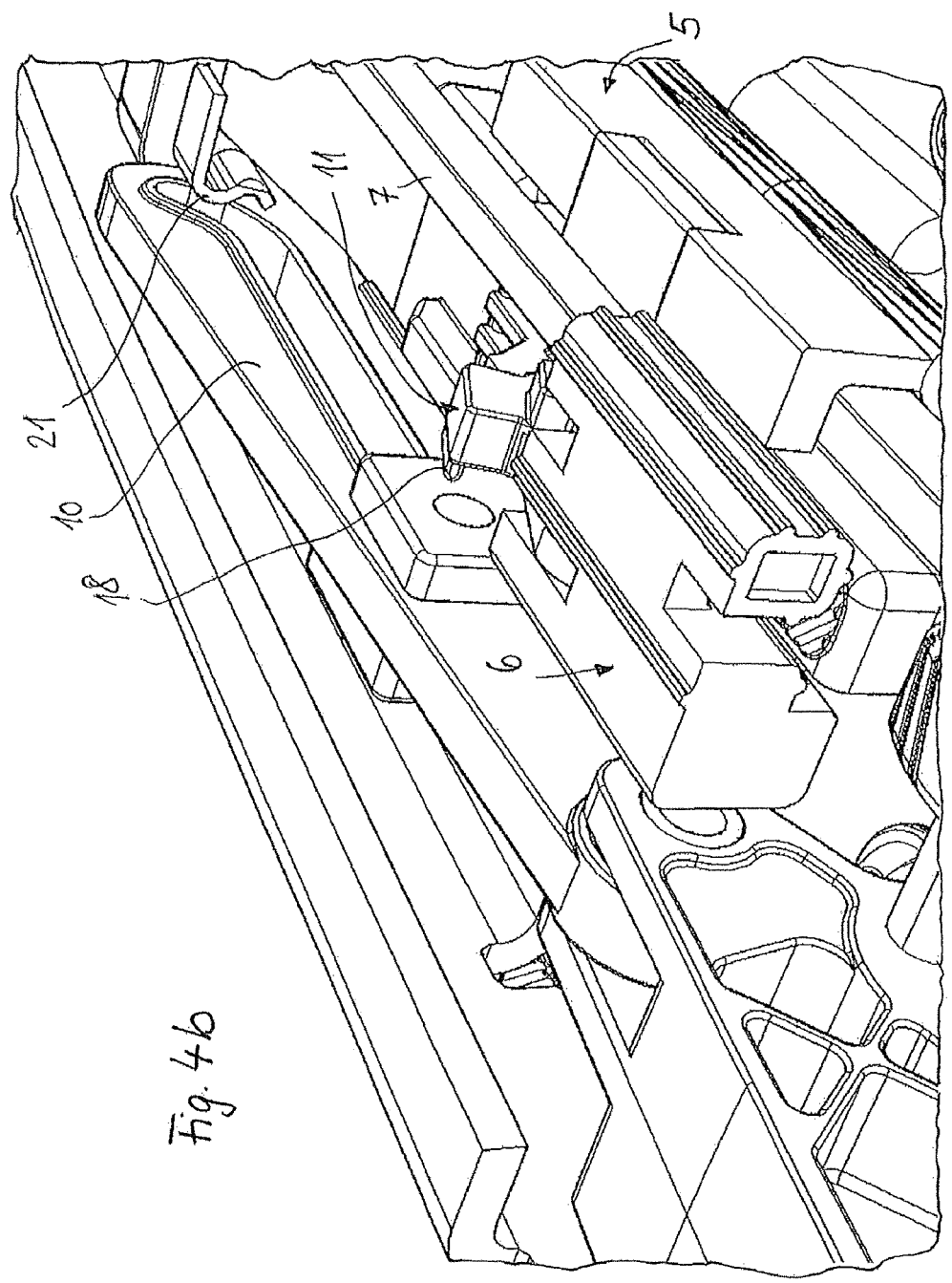

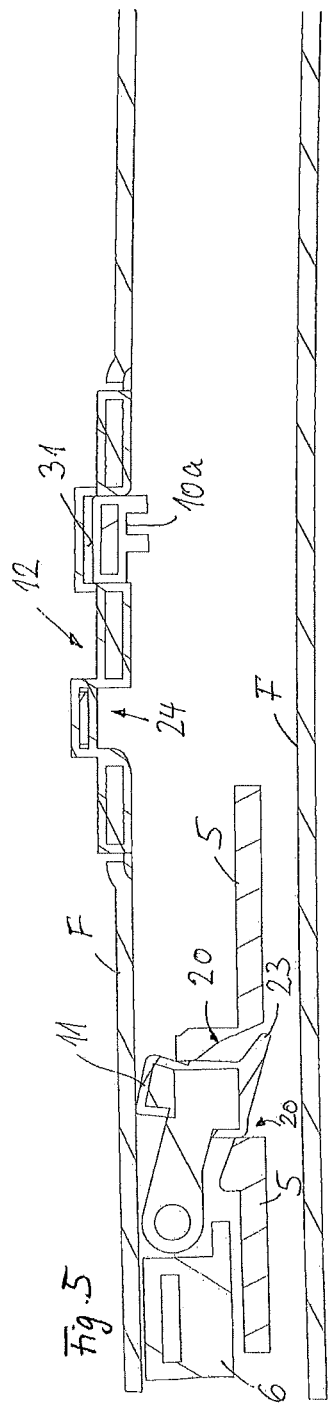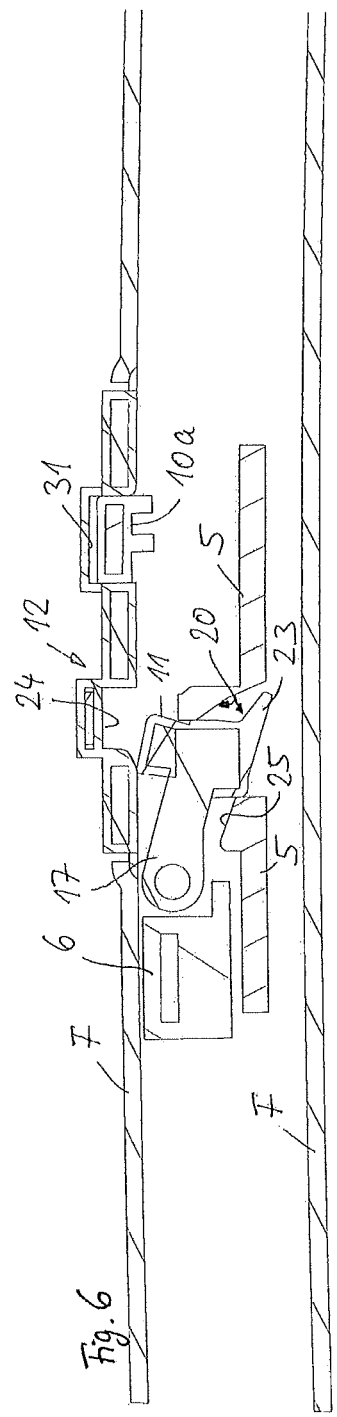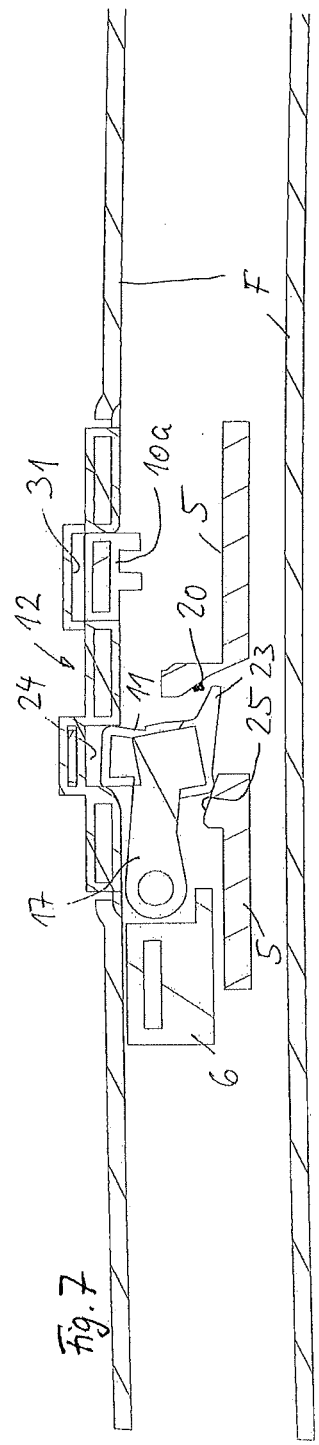

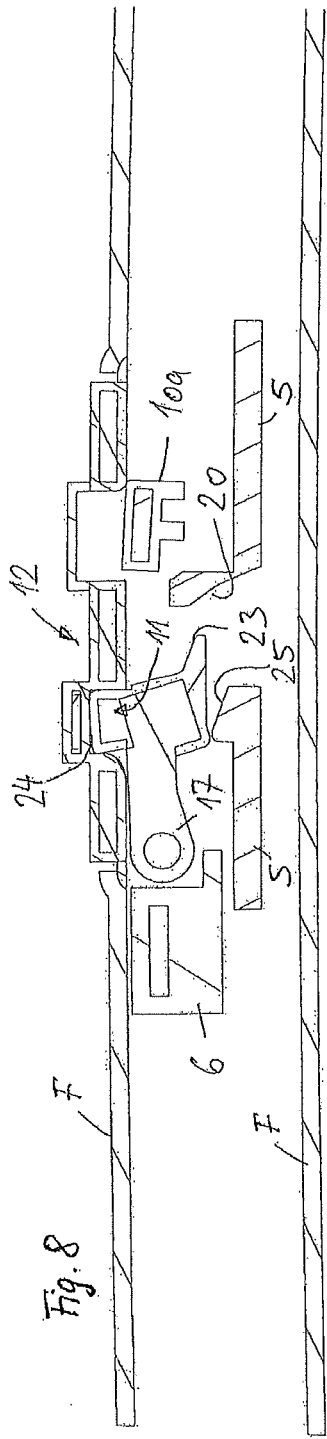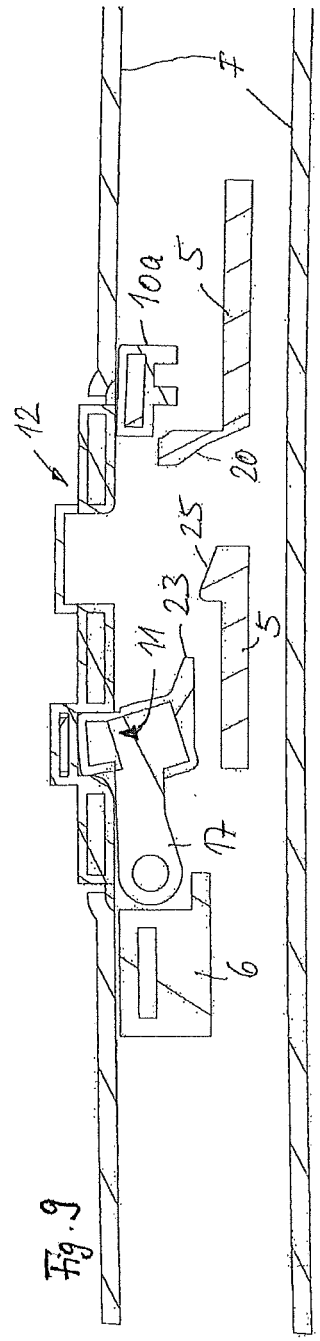

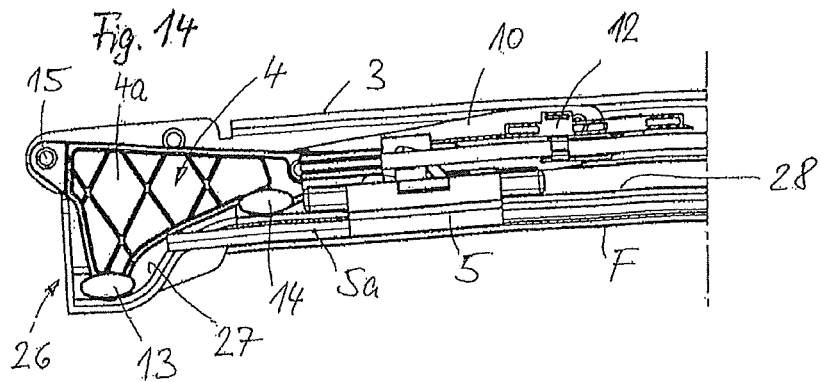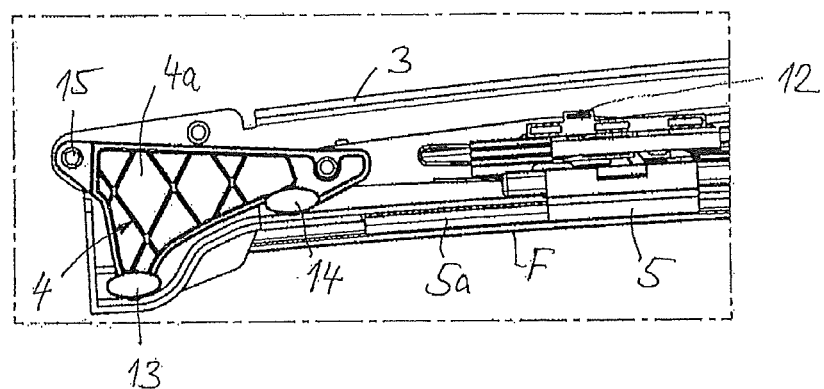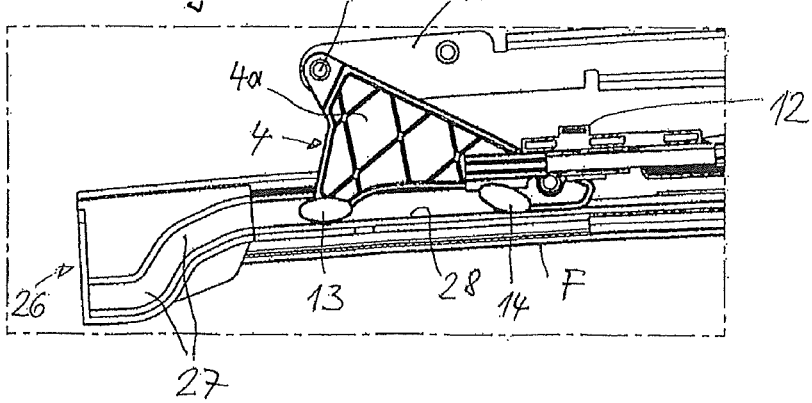

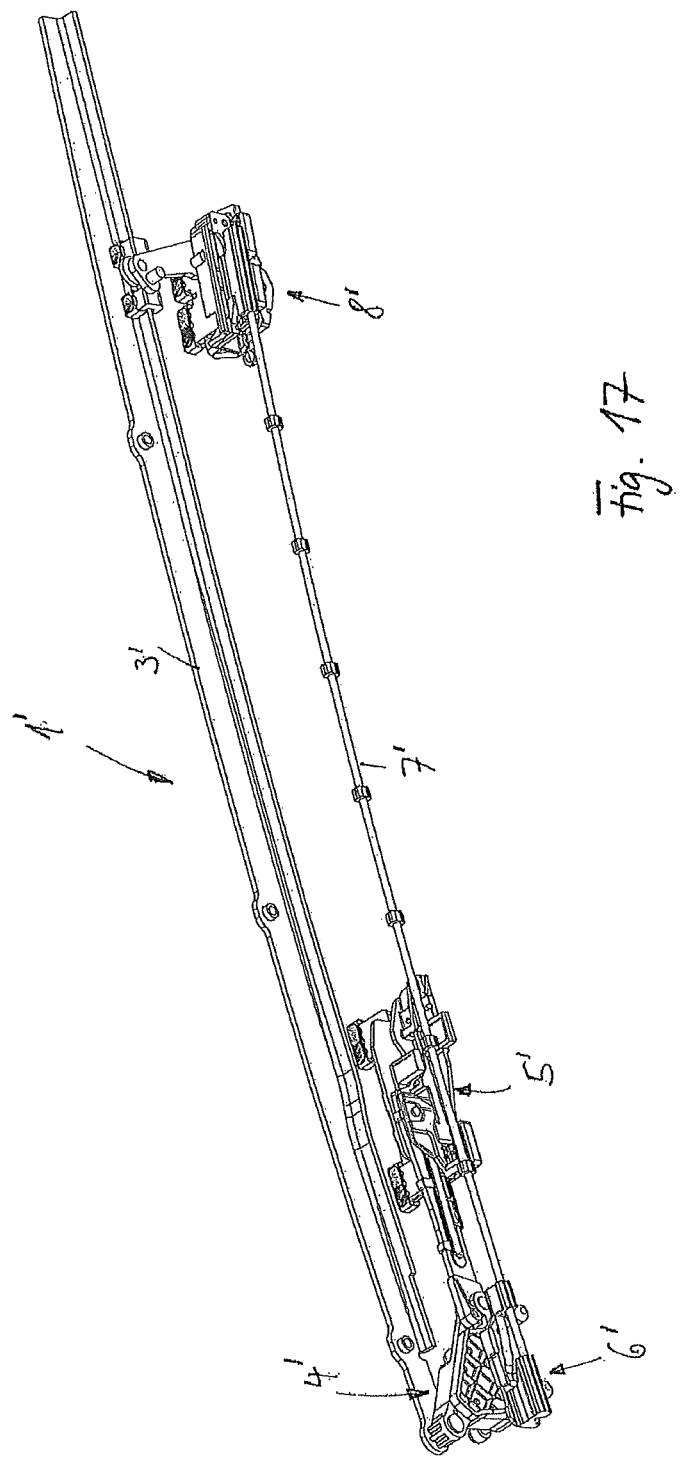

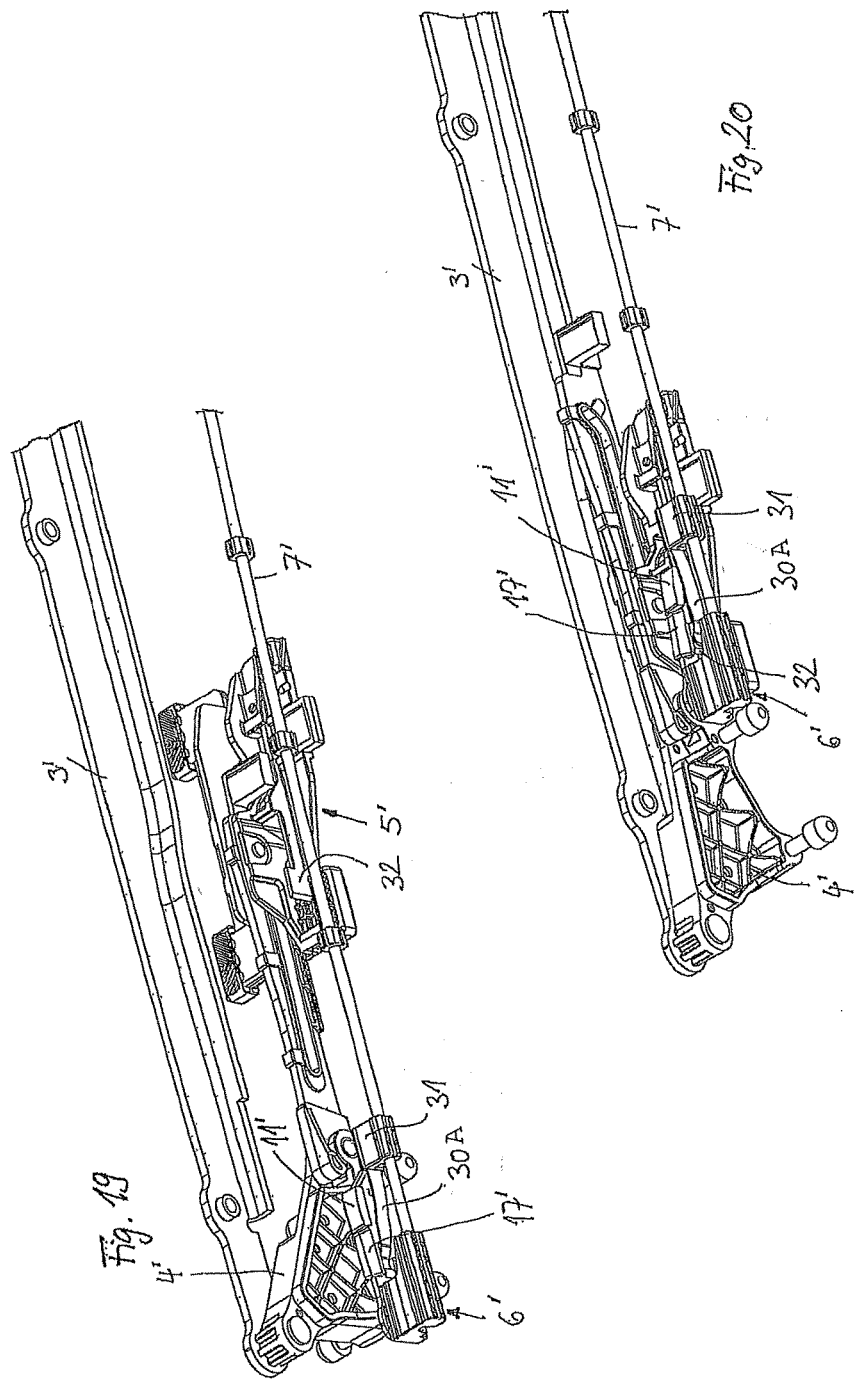

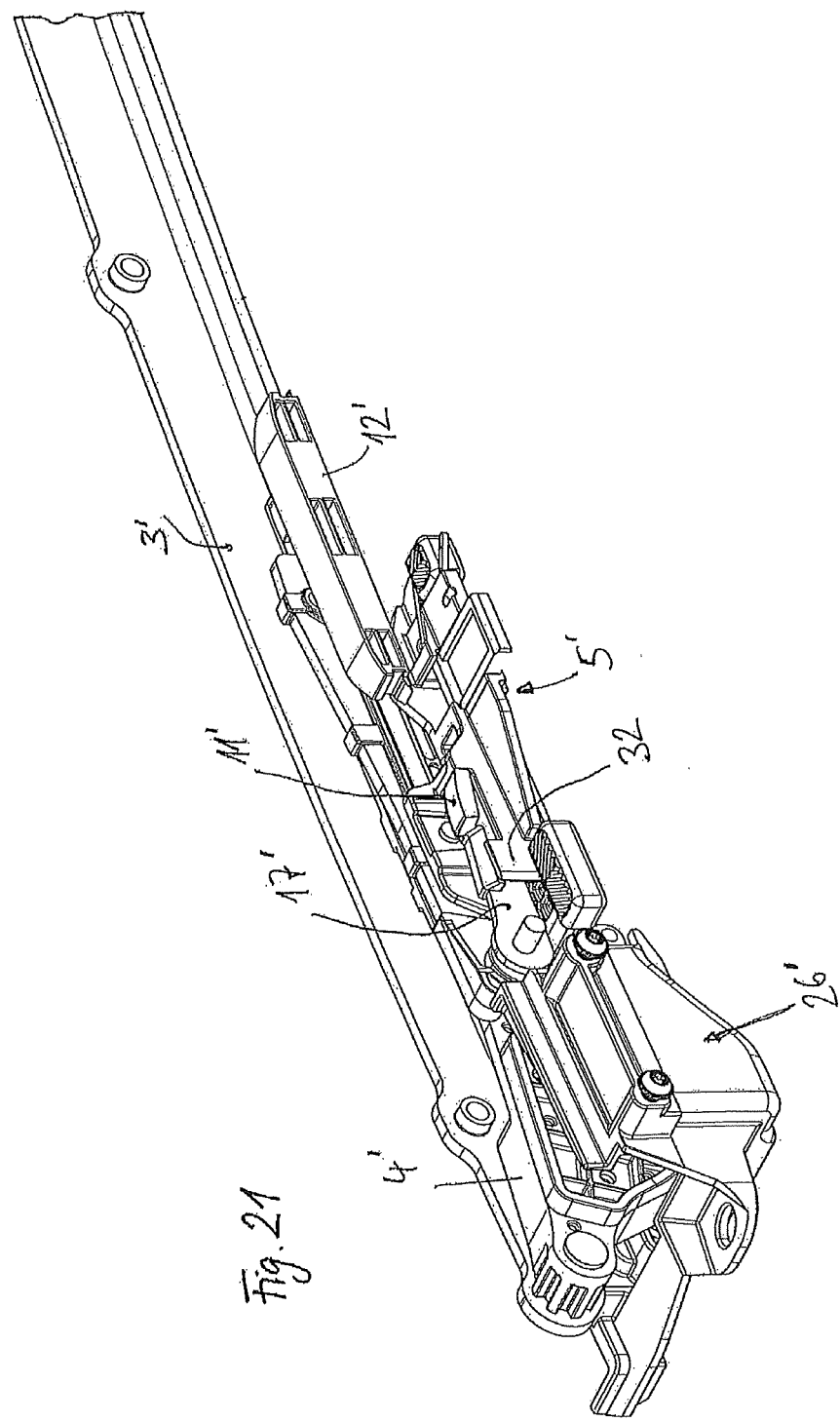

DRIVE SYSTEM FOR A MOVABLE ROOF PART OF A ROOF MODULE OF A MOTOR VEHICLE

The invention relates to a drive system for a movable roof part of a roof module of a motor vehicle, comprising a guide rail arrangement installed fixed to the roof module in the ready-for-use assembled condition, comprising a drive slide which is lengthwise displaceable along the guide rail arrangement via drive transmission means, comprising a front-side lifting arrangement and a rear-side deployment mechanism, and comprising a support profile on which the roof part is fixed in the ready-for-use assembled condition, wherein the lifting arrangement and the deployment mechanism interact with the support profile in such a manner that the support profile is forcedly guided between a closed position of the roof part, a ventilation position and an open position of the roof part, and comprising a coupling device to produce a distance-controlled operative connection between the rear-side deployment mechanism and the drive slide.

DE 10 2005 007 031 A1 discloses a drive system for a movable roof part of a roof module of a passenger vehicle. The movable roof part is connected to a respective support profile on each of its opposite sides, which support profile is displaceable by a respective front-side lifting arrangement and a rear-side deployment mechanism, in order to displace the roof part between a closed position, a ventilation position and an open position, wherein the roof part exposes a roof opening portion and is displaced beyond a stationary roof part rearwards. Controlling the opposed support profiles is in synchronization via pairs of identical front-side lifting arrangements and rear-side deployment mechanisms, which are displaceable in opposite guide rail arrangements of the roof module. For activating the respective lifting arrangement and the respective deployment mechanism, each of the two opposite drive sides of the drive system is provided with a respective drive slide which is shiftable along the respective guide rail arrangement via drive transmission means. The drive transmission means are driven in synchronization via a central drive unit.

An object of the invention is to provide a drive system of the type mentioned in the introduction, which allows reliable control of the movable roof part by simple means.

This object is achieved in that the coupling device, on the terminal portion thereof remote from the deployment mechanism, includes a coupling slide guided in the guide rail arrangement, which slide comprises a blocking member movable in the vertical direction, in that a latching recess fixed in location is provided within the guide rail arrangement, and in that the drive slide has a seat, wherein the blocking member is forcedly controlled into the latching recess or into the seat by mechanical control contours as a function of a position of the drive slide. Owing to the solution according to the invention, the coupling slide is either blocked fixed in location within the guide rail arrangement, or entrained by the drive slide, depending on the condition as to what control function of the support profile and, thus, of the roof part is executed in each case. The drive system according to the invention comprises preferably two drive sides, each assigned to the opposite longitudinal sides of the movable roof part. Each of said drive sides includes a respective support profile, which is connected to the movable roof part. Each drive side furthermore comprises a respective front-side lifting arrangement and a rear-side deployment mechanism, and a coupling device, each comprising a coupling slide which is provided with a respective blocking member movable in the vertical direction. What is meant by the "vertical direction" is an orientation of the roof module on the motor vehicle in the ready-for-use assembled condition such that the vertical direction corresponds at least largely to a vertical direction of the vehicle. In analogy, the terms "front-side" and "rear-side" are considered to be definitions positioned to the front and to the rear in the longitudinal direction of the vehicle. Consequently, the respective front-side lifting arrangement is assigned to a front part of the respective support profile of the movable roof part, while the rear-side deployment mechanism is used to raise, lower and lengthwise guide a rear part of the support profile. Mobility of the blocking member in the vertical direction comprises mounting of the blocking member for linear movement, or mounting for movement along a curved trajectory, or even mounting for pivoting motion of the blocking member on the coupling slide. Advantageously, the invention is provided on a roof module of a passenger vehicle.

In an embodiment of the invention, the blocking member has on one side a contour complementary to the latching recess and on an opposite side a seat contour matched to the seat in the drive slide. Preferably, the latching recess is positioned fixed in location in the vicinity of an upper side of the guide rail arrangement contour. During a movement of the blocking member upwards, the blocking member consequently makes contact with the latching recess and blocks further movement of the coupling slide. Simultaneously, the blocking member comes off the seat in the drive slide. The blocking member is either captured in the latching recess of the guide rail arrangement or in the seat in the drive slide. Therefore, an upper section of the blocking member has a design complementary to the shape of the latching recess, whereas a lower section of the blocking member has a design complementary to the seat in the drive slide, in order to allow respectively an at least essentially clearance-free plunging of the blocking member into the latching recess or into the seat in the drive slide.

In a further embodiment of the invention, a support element is attached to the coupling slide, which element is mounted to be movable between a support position securing the blocking member in a latching position and a release position releasing the blocking member for a downwards lowering move. In the latching position of the blocking member, the blocking member is positioned fixed in location in the vicinity of the upper side of the guide rail arrangement. Upon lowering of the blocking member downwards, the blocking member can plunge into the seat of the drive slide. The movable support element secures the blocking member in the latching position and releases it for a downwards movement, respectively, in that the support element is transferred to the release position. Transferring the support element to the release position is preferably by forced control via a corresponding movement of the drive slide.

In a further embodiment of the invention, the support element is mounted to be movable in the transverse direction of the guide rail arrangement. Thus, the support element is movable transversely in relation to a traveling distance of the coupling slide. Consequently, the support element is movable transversely in relation to the blocking member that is likewise disposed on the coupling slide.

In a further embodiment of the invention, the support element is embodied in a leaf spring leg which is clamped on the coupling slide and elastically movable such that the leaf spring leg is pivotable in the transverse direction of the guide rail arrangement. The leaf spring leg is pre-tensioned in the direction towards the support position, wherein the leaf spring leg can engage under the blocking member, in order to support it and prevent its lowering downwards.

In a further embodiment of the invention, the drive slide includes a control member which directs the support element during a relative displacement between coupling slide and drive slide from the support position to the release position. Advantageously, the control member is a control blade, fixedly disposed on the drive slide and urging the support element sidewards, once the coupling slide and the drive slide are correspondingly moved towards one another.

In a further embodiment of the invention, the support element is permanently spring-loaded in the direction towards the support position. Thus, the support element in the unloaded condition is necessarily positioned in its support position. In case of an external forced control acting thereon, the support element can be transferred to the release position counter the spring force. For displacing the support element, in particular the leaf spring leg, from the support position to the release position, a forced control element of the drive slide can be provided to apply force to or release the support element, i.e., in particular the leaf spring leg, as a function of the position of the drive slide. Pivoting of the leaf spring leg is by bending. With a horizontal orientation of a bottom of the guide rail arrangement the support element is likewise horizontally displaceable. In case the support element is configured as a leaf spring leg, the leaf spring leg is elastically bendable in the horizontal transverse direction.

The object of the invention is also achieved in that the front-side lifting arrangement includes a dimensionally stable multi-point support body produced as a one-piece component made of synthetic material, which body includes two support axes guided in the guide rail arrangement and a point of articulation to which the support profile is articulated on the front side. Owing to the solution according to the invention, the front-side lifting arrangement has a particularly robust and simple configuration and, thus, production costs are low. The two support axes guided in the guide rail arrangement can be provided with sliding elements, in order to allow low-friction displacement along the guide rail arrangement. Preferably, the synthetic material component is made of a thermoplastic synthetic material, whereby production of the multi-point support body is simple and cost-efficient. Preferably, the synthetic material component is provided with reinforcing ribs, in order to ensure particularly high bending rigidity and torsional resistance.

In an embodiment of the invention, the guide rail arrangement includes on the front side a curved section extending between two different levels of height, wherein at least one support axis of the multi-point support body is positioned in the closed position of the roof part. The curved section has a curved rail section which—as seen from the front—transitions from a lower level of height to a higher level of height. Thus, the curved section extends both in the longitudinal and in the vertical directions. The at least one support axis of the multi-point support body is positioned in a front terminal portion of the curved section, in the closed position of the roof part, and thus, in the region of the lower level of height and, during a displacement of the multi-point support body towards the rear, is forcedly raised by lengthwise moving along the curved section.

In a further embodiment of the invention, the curved section is produced as a separate component and joined to a guide rail profile of the guide rail arrangement. The guide rail profile of the guide rail arrangement ensures longitudinal displacement on an at least essentially constant level of height, while the curved section comprises a lowered front region in relation to the guide rail profile.

Further advantages and features of the invention will become apparent from the claims and from the description below of preferred exemplary embodiments of the invention which are illustrated with reference to the drawings.

FIG. 3 shows the drive system according to FIGS. 1 and 2 in a further functional position;

FIG. 4a shows in a perspective view a section of the drive system according to FIGS. 1 to 3;

FIG. 4b shows in an enlarged perspective view the section according to FIG. 4a;

FIGS. 5 to 9 show in longitudinal sectional views the drive system according to FIGS. 1 to 4b in different functional positions of a blocking member of a coupling slide of the drive system within a guide rail arrangement;

FIGS. 14 to 16 show in a partial view of a longitudinal section a front region of the drive system with a front-side lifting arrangement in different functional positions;

FIGS. 17 to 21 show in different partial perspective views another embodiment of a drive system according to the invention similar to FIGS. 1 to 16.

Figure 1:
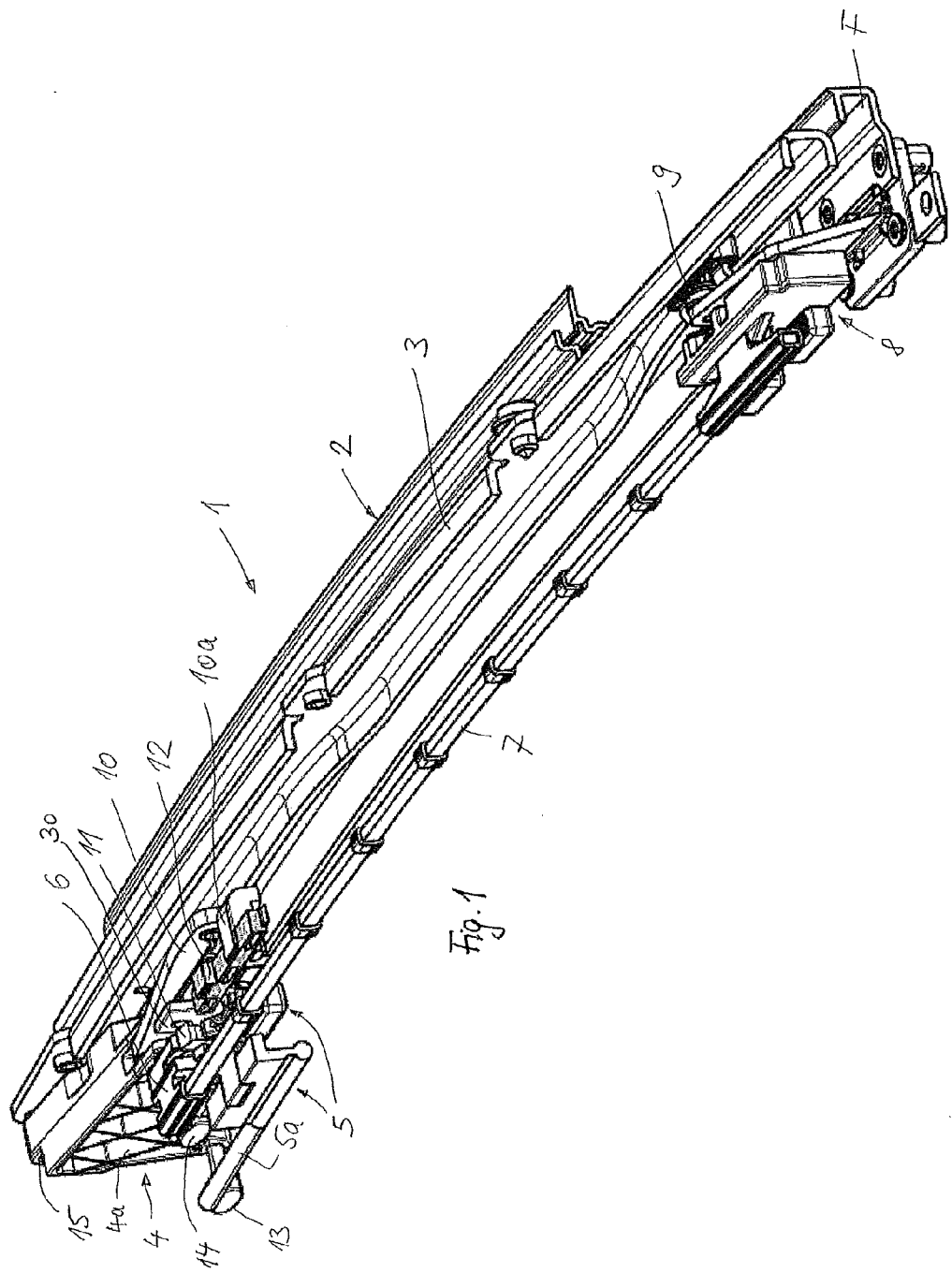
FIG. 1 shows in a perspective view a drive side of an embodiment of a drive system according to the invention for a movable roof part of a roof module of a passenger vehicle in a first functional position.

A drive system 1 according to FIGS. 1 to 16 is disposed in a roof module frame 2 of a roof module of a passenger vehicle, wherein the roof module frame 2 according to FIG. 1 is illustrated merely in sections across a partial region of a length of the roof module frame 2. The roof module frame 2 is installed in a generally well-known manner into a roof opening portion of the passenger vehicle. The roof module comprises—as seen in the ordinary driving direction of the passenger vehicle—a front roof part which is disposed to be displaceable along the roof module frame between a closed position, a ventilation position and an open position. Moreover, the roof module comprises a further rear roof part, held fixed in location, which is firmly connected to the roof module frame. The front, movable roof part is raised over and beyond the stationary, rear roof part and shifted towards the rear-side along the roof module frame 2 during the transition to its open position. In the open position, the movable roof part overlaps the stationary roof part largely in the longitudinal direction of the vehicle. The movable roof part in its closed position closes a roof module opening portion of the roof module frame 2. In its open position, the movable roof part exposes said roof module opening portion so that a vehicle interior compartment of the passenger vehicle is open towards the top through the roof module opening portion in the open position of the movable roof part. The roof module is supplied to the passenger vehicle during production of the passenger vehicle in the form of an at least largely pre-assembled structural unit, and fitted into the open roof cut-out of the vehicle roof of the passenger vehicle.

For displacing the movable roof part from the closed position to the ventilation position and to the open position and in the inverse function back to the closed position, the movable roof part is assigned a drive system 1 which will be described in more detail below with reference to FIGS. 1 to 16. The drive system 1 has two drive sides, configured in mirror-symmetrical design, but for the rest embodied identical to each other, which drive sides are driven via a central electric motor in synchronization and are arranged on opposite longitudinal sides of the movable roof part. With reference to FIGS. 1 to 16 merely the left drive side of the drive system 1, in the driving direction of the passenger vehicle, is illustrated. The opposite drive side has an identical structure, except for the above mentioned mirror-symmetrical design.

On both sides lengthwise of the roof module frame 2, a respective guide rail arrangement F is provided. With reference to FIGS. 1 to 16, the guide rail arrangement F on the left hand side, in the driving direction, is apparent. On its opposite longitudinal sides, the movable roof part is fixed to a respective dimensionally stable support profile 3 which is raised, lowered and displaceable along the roof module frame 2 via the respective drive side of the drive system 1.

Owing to the synchronous design and actuation of the opposite drive sides, a desired parallel displacement of the movable roof part is obtained. In the closed position, the movable roof part tightly closes the roof module opening portion, and its upper side is oriented flush with an upper side of the stationary roof part and with an upper side of the vehicle roof. In a ventilation position, the movable roof part is in an inclined position, in that its rear border area is deployed upwards in relation to a front border area of the stationary roof part. For transferring the movable roof part from the ventilation position to the open position, the front border area of the movable roof part is also raised so that the movable roof part in total can be shifted beyond the stationary roof part towards the rear. Transferring to the closed position is in the inverse order.

For executing the corresponding movements of the movable roof part, each drive side of the drive system 1 includes a drive slide 5 which is mounted in the guide rail arrangement F to be lengthwise displaceable. The drive slide 5 is driven via a drive transmission means 5*a* in the form of a flexshaft. The drive transmission means 5*a* is mounted for longitudinal shifting in a corresponding longitudinal groove of the guide rail arrangement F. The drive transmission means 5*a* is driven by an electric motor via a toothed gear mechanism, which is the central drive unit for the drive system 1. Said electric motor drives in synchronization also the opposite drive transmission means and the opposite drive slide, both not illustrated.

The drive system 1 furthermore includes for each drive side a lifting arrangement 4, disposed on the front side in the guide rail arrangement F and connected to a front face end region of the support profile 3. For that purpose, the lifting arrangement 4 has a point of articulation 15 and the front face end region of the support profile 3 is articulated thereto.

Furthermore, a rear deployment mechanism 8 engages on a rear portion of the support profile 3, which mechanism is provided firstly to raise the rear region of the support profile 3 upwards via a slip joint 9, and secondly to offer guidance for longitudinal shifting of the support profile 3 rearwards. A coupling profile 7 protrudes from the rear deployment mechanism 8 frontwards in the direction towards the front lifting arrangement 4 and towards the drive slide 5, which coupling profile passes over in a coupling slide 6 on the front face end region thereof.

Both the drive slide 5 and the coupling slide 6 are mounted in the guide rail arrangement F for longitudinal displacement. The coupling slide 6 is—as seen in the longitudinal direction—arranged in front of the drive slide 5.

The front lifting arrangement 4 includes a multi-point support body 4*a* which has an essentially triangular design and is a one-piece synthetic material component including reinforcement ribs. On a front, upper corner of the multi-point support body, the point of articulation 15 for the articulation of the support profile 3 is provided. Spaced from the upper point of articulation 15, the multi-point support body 4*a*, moreover, includes two support axes 13, 14 which are provided with sliding bodies, in order to allow sliding movement of the multi-point support body 4*a* in the guide rail arrangement F. On a rear corner region of the multi-point support body 4*a*, moreover, a control lever 10 is pivotably articulated and includes a control connecting link 29 extending in the longitudinal direction, said control connecting link 29 ending in an upward curvature on the rear end region thereof. A locking element 10*a* is fixed to a rear face end region of the control lever 10 and protrudes in the transverse direction to the control lever 10.

The drive slide 5 includes a slide body which is guided for longitudinal shifting in the guide rail arrangement F using sliding elements. A guiding block 30 protrudes from the slide body upwards and is provided with a sliding pin projecting into the control connecting link 29 of the control lever 10.

The coupling slide 6 is provided with a pivotable blocking member 11 which is pivotably mounted in the coupling slide 6 by means of a pivot arm 17. Both the pivot axis of the blocking member 11 and corresponding joint axes of the front lifting arrangement 4 and the rear deployment mechanism 8 extend in parallel to each other, transversely to the longitudinal direction of the guide rail arrangement F and, thus, in the vehicle transverse direction in the ready-for-use assembled condition of the roof module.

In an upper region, the blocking member 11 has a hammer-shaped contour which is provided complementary to a latching recess 24 of a latching structure 12 disposed in the region of an upper side of the guide rail arrangement F and fixed in location. The latching structure 12, moreover, has a securing seat 31 disposed at a distance behind the latching recess 24, which seat is provided for form-fitted accommodation of the locking element 10*a* of the control lever 10. The latching structure 12 is embodied in a one-piece component which is embedded in an upper ceiling wall of the guide rail arrangement F. For that purpose, the upper ceiling wall of the guide rail arrangement F is provided with a complementary recess into which the latching structure 12 is inserted.

The blocking member 11 has a control nose 23 in the region of an under side, which nose protrudes towards the rear in opposition to the pivot arm 17. In the region of the underside of the blocking member 11, moreover, the blocking member 11 includes a support edge (not illustrated in more detail) opposite the control nose 23, which support edge ensures securing of the lower region of the blocking member 11 in a seat 20 of the drive slide 5 (cf. FIGS. 5 and 6). The seat 20 of the drive slide 5 is configured such that the lower region of the blocking member 11 can plunge into the seat 20 and is held therein in a form-fitting manner. An upper edge of the hammer contour of the blocking member 11 slides along the interior side of the ceiling wall of the guide rail arrangement F, with the blocking member 11 captured in the seat 20 of the drive slide 5, so that the blocking member 11 cannot draw away towards the top.

The hammer contour of the blocking member 11 in the upper region of the blocking member 11 is, furthermore, provided with a latching nose 18 protruding transversely outwards and cooperating with a latching spring 21 curved in an S-shape within the latching recess 24 of the latching structure 12. The latching spring 21 is a leaf spring including a retaining section inserted into a slot of the latching structure 12 and a spring section projecting downwards into the latching recess 24 in an S-shaped arch. With reference to FIG. 4*b*, the clear cut latching spring 21 is apparent which is inserted horizontally into the slot of the latching structure 12 from the side facing the control lever 10, as illustrated in FIG. 4*a*. For better understanding, the latching structure 12 is not illustrated in FIG. 4*b*. The retaining section of the latching spring 21 is held clamped within the slot of the latching structure 12. The spring section of the latching spring 21 projects into the latching recess 24 in an arch shape from one side in such a manner that the spring section comes in operative connection to the latching nose 18 which protrudes inwards in a cam-type from the blocking member 11 in the direction towards the control lever 10, once the blocking member 11 is pivoted upwards. The spring section of the latching spring 21 is urged elastically outwards by the latching nose 18, far enough that the latching nose 18 is captured above the arched portion of the spring section of the latching spring 21 projecting into the latching recess 24. For improved clarity, in the illustration according to FIG. 4*b*, merely a few parts and sections are provided with reference numerals, since the corresponding reference numerals can easily be taken from the FIG. 4*a*. The latching nose 18 in connection with the latching spring 21 ensures that the blocking member 11 remains captured in the latching recess 24 of the latching structure 12, upon plunging into said latching recess 24.

Moreover, the blocking member 11 includes a control cam 19 at a distance below the latching nose 18, likewise protruding transversely outwards and cooperating with a control contour 22 which is integrally molded to the latching structure 12 and projects into the trajectory of the blocking member 11 and the control cam 19, respectively. The control contour 22 is intended to direct the blocking member 11 upwards from the seat 20 in the drive slide 5 and to forcedly guide it into the fixed in location latching recess 24 of the latching structure 12.

The seat 20 of the drive slide 5 has, as apparent with reference to FIGS. 5 to 7, on the rear side a wall extending obliquely to the front and to the top, in the function of a control contour, capable to interact with the control nose 23 of the lower region of the blocking member 11, in order to retract the blocking member 11 back out from the latching position in the latching recess 24 of the latching structure 12 and secure it in the seat 20, upon a longitudinal movement of the drive slide 5 towards the front from a rearwards displaced position. The seat 20 moreover includes, opposite to the above described wall section—likewise in the function of a control contour—a ramp surface 25 which during a shifting move of the drive slide 5 towards the rear, according to FIGS. 5 to 7, is to urge the hammer contour of the blocking member 11 into the latching recess 24 of the latching structure 12. The ramp surface 25 supports the control contour 22 which can likewise exert a corresponding torque upwards on the blocking member 11 via the control cam 19.

The guide rail arrangement F includes a rail surface 28 (FIGS. 14 to 16) where the drive slide 5 slides along. On a front face end region the guide rail arrangement F is provided with a curved section 26 which forms a curved guide track 27 which guides the rail surface 28 towards the front in a curve downwards and in an opposite curved arch towards a lower level of height in relation to the rail surface 28. The curved section 26 is a separate component made of synthetic material which is joined on the front side to a guide rail profile comprising the rail surface 28. The support axis 13 of the multi-point support body 4*a* is positioned in said front side curved section 26, for the time being while the support profile 3 is in the closed position or the ventilation position of the movable roof part. In said position, necessarily, both the support axis 13 and also the point of articulation 15 are lowered in relation to the guiding surface defined by the rail surface 28. Once the lifting arrangement 4 together with the multi-point support body 4*a* is displaced towards the rear, according to FIG. 16, the support axis 13 is displaced upwards within the curved contour 27 and slides along the rail surface 28 of the guide rail arrangement F. The support axes 13, 14 are now located in a common plane. As a result, the multi-point support body 4*a* is necessarily inclined obliquely upwards, whereby the point of articulation 15 is displaced towards the top. Thus, the front face end region of the support profile 3 is necessarily also displaced upwards, whereby the roof part is raised also in the region of its front face end edge.

The rear-side deployment mechanism 8 includes a control slide on which the coupling profile 7 is firmly disposed. The control slide is mounted in the guide rail arrangement F to be shiftable in relation to pivot kinematics of the deployment mechanism 8, whereby a desired deployment or lowering of the rear portion of the support profile 3 is effected by means of the slip joint 9.

Figure 2:
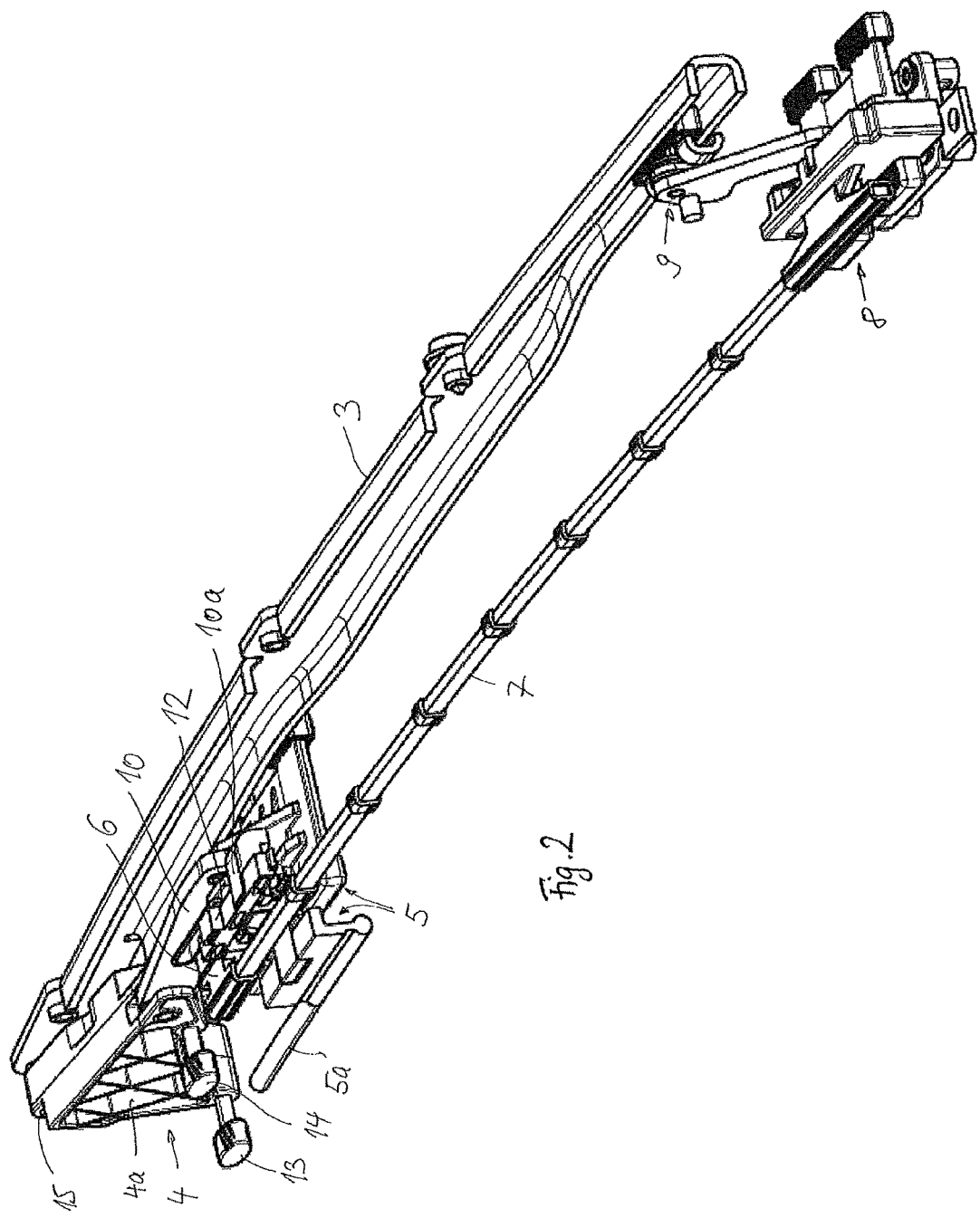
FIG. 2 shows the drive system according to FIG. 1 in a second functional position.
Figure 10:
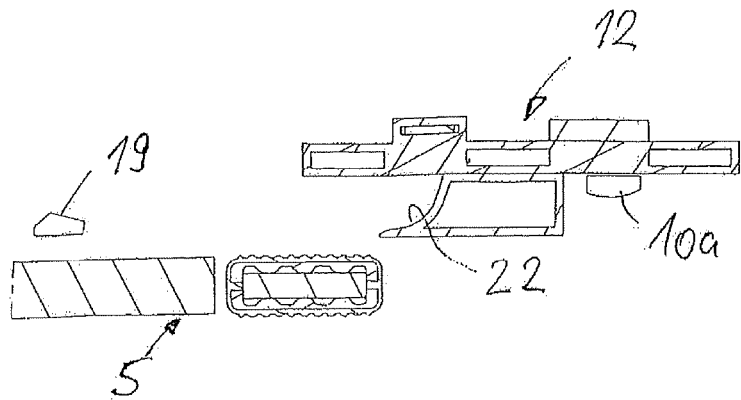
FIGS. 10 to 13 show partial views of longitudinal sections of the drive system according to FIGS. 1 to 9 in another longitudinal sectional plane, likewise in different functional positions of the blocking member.
Figure 11:
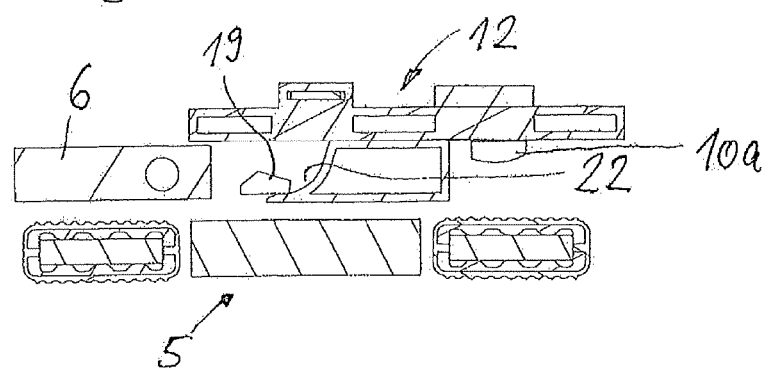
Figure 12:
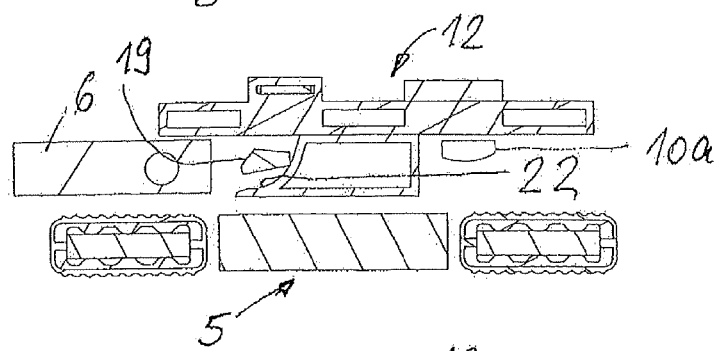
Figure 13:
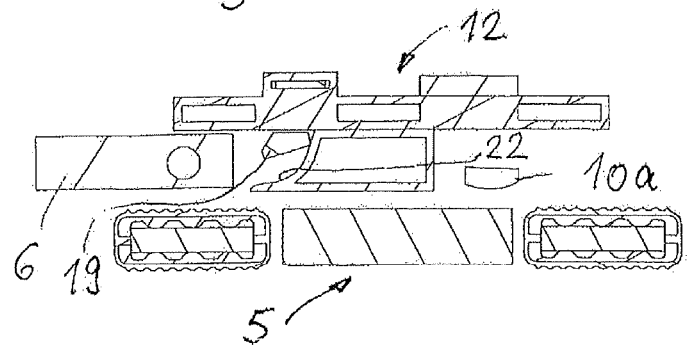
Figure 18:
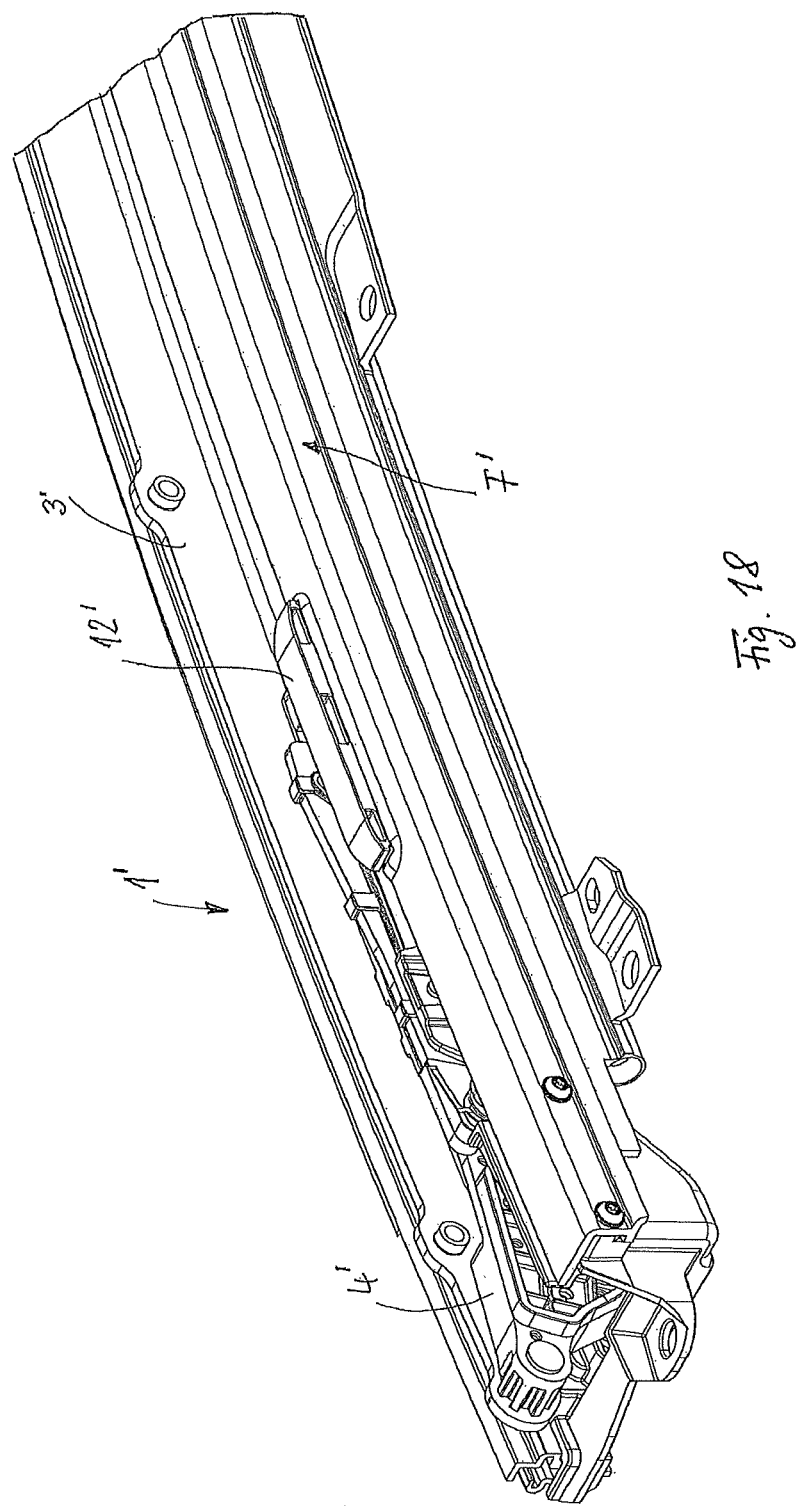

Deployment of the rear portion of the support profile 3, causing transfer of the roof part from the closed position to the ventilation position, is achieved in that the drive slide 5 starting from the closed position of the drive system 1 (FIG. 1) is moved along the guide rail arrangement F to the rear. Since the coupling slide 6 is received in the seat 20 of the drive slide 5 in a form-fitting manner via the blocking member 11, the control slide of the rear-side deployment mechanism 8 is also shifted to the rear via the coupling profile 7. As a result, the slip joint 9 extends towards the top (FIG. 2). During said displacing move of the drive slide 5, the sliding pin of the guiding block 30 of the drive slide 5 slides along in the control connecting link 29 of the control lever 10. Once the sliding pin of the guiding block 30 has reached the upwards curved rear terminal portion of the control connecting link 29, the control lever 10 plunges downwards, whereby the locking element 10*a* comes off the blocking seat 31 of the latching structure 12. The control lever 10 is further entrained rearwards in the longitudinal direction via the guiding block 30, as long as the drive slide 5 is moved further rearwards. A front point of articulation of the control lever 10, which is articulated to the multi-point support body 4*a*, necessarily draws the multi-point support body 4*a* also to the rear, whereby the multi-point support body 4*a* comes off the front-side curved section 26 of the guide rail arrangement F and deploys obliquely upwards. Now, the support profile 3 is both in its front terminal portion and in its rear terminal portion raised above the level of the stationary roof part so that upon a further displacement move of the drive slide 5 rearwards, the support profile 3 and, thus, the movable roof part is moved to the rear into the open position. Thereby, the support profile 3 slides along a corresponding sliding block of the slip joint 9, while the rear-side deployment mechanism 8 remains in the deployed functional position of the slip joint 9.

During transferring the control lever 10 and the locking element 10*a* downwards to the release position, the blocking member 11 is simultaneously managed out of the seat 20 in the drive slide 5 upwards and secured in the latching recess 24, so that the coupling slide 6 remains in a position fixed in location relative to the guide rail arrangement F. Thereby, the control slide of the rear-side deployment mechanism 8, necessarily, also remains in the corresponding displaced position which corresponds to the deployed functional position of the slip joint 9.

During returning the support profile 3 in the direction towards the closed position, the corresponding movement processes occur in the inverse direction, whereby the locking element 10*a* is again managed into the blocking seat 31 of the latching structure 12 and simultaneously the blocking member 11 is managed out of the latching recess 24 and again managed into the form-fitting securing position within the seat 20 of the drive slide 5.

The drive system 1' according to FIGS. 17 to 24 corresponds essentially to the drive system 1 according to FIGS. 1 to 16, as described above. Therefore, parts and portions of the drive system 1' of similar functionality are marked with the same reference numerals and an inverted comma "'" added thereto. To avoid repetitions, in relation to the embodiment according to FIGS. 17 to 24, reference is additionally made to the disclosure in relation to the drive system according to FIGS. 1 to 16. The description below will refer predominantly to the differences of the drive system 1' according to FIGS. 17 to 24.

The drive system 1' includes a coupling slide 6' which is connected to a rear-side deployment mechanism 8' via an elongate coupling profile 7'. The corresponding drive side of the drive system 1' is displaceable in a guide rail arrangement F' in analogy to the drive side of the drive system 1 according to FIGS. 1 to 16. A support profile 3' of a corresponding movable roof part is displaceable by means of the front-side lifting arrangement 4' and the rear-side deployment mechanism 8' to the different positions. The drive slide 5' is provided to be moved within the guide rail arrangement F' and, thereby, cause corresponding control of the front-side lifting arrangement 4' and the rear-side deployment mechanism 8'.

The coupling slide 6', which has the same functionality as the coupling slide 6 according to the embodiment according to FIGS. 1 to 16, includes a blocking member 11' which is mounted to be pivotable about a pivot axis extending in the transverse direction of the guide rail arrangement F'. Consequently, the blocking member 11' is pivotable upwards and downwards essentially in the vertical direction of the guide rail arrangement. The drive slide 5' and the coupling slide 6' are both shiftable in the longitudinal direction of the guide rail arrangement F'.

In analogy to the drive system 1 according to FIGS. 1 to 16, the guide rail arrangement F' is also associated with a latching structure 12' disposed in the region of an upper side of the guide rail arrangement F' and fixed in location. In the latching structure 12 is provided a latching recess 24' open towards the bottom which is provided for accommodation of a hammer-shaped contour of the blocking member 11. The blocking member 11' has, in the region of its underside, i.e., essentially opposite the hammer-shaped contour, a control nose 23' which interacts with a seat 20' of the drive slide 5', in analogy to the drive slide 5 according to FIGS. 1 to 16. The drive slide 5' also includes a ramp surface 25', with the functionality thereof corresponding to the ramp surface 25 of the drive system 1 according to FIGS. 1 to 16.

An essential difference with the embodiment according to FIGS. 17 to 24 is in that the blocking member 11' in the upper blocking position (cf. FIG. 19) is retained by a support element 30A which is attached to the coupling slide 6'. For that purpose, the coupling slide 6' includes a coupling member 31 attached to the coupling profile 7', which member is positioned at a distance to the rear side of a guiding body (not illustrated in more detail) of the coupling slide 6'. The support element 30A is configured as a leaf spring leg which is clamped in the coupling member 31 and protrudes towards the guiding body of the coupling slide 6'. The leaf spring leg protrudes laterally inwards relative to the coupling profile 7' in the transverse direction and has a free terminal portion which engages under a support section of the pivot arm 17' of the blocking member 11' in the vertical direction in a form-fitting manner, in the illustration according to FIG. 19. The leaf spring leg of the support element 30A is permanently spring-loaded in the transverse direction inwards, i.e., towards the front-side lifting arrangement 4'.

The drive slide 5' includes an edgewise oriented control blade (control member) 32 which is integrally formed on the drive slide 5' and is oriented in the longitudinal direction of the guide rail arrangement. The control blade 32 is positioned in such a manner that, during a relative movement of drive slide 5' and coupling slide 6' in relation to each other in the longitudinal direction of the guide rail arrangement F', said blade can plunge in between the blocking member 11' and the coupling member 31, whereby the control blade 32, necessarily, urges the transversely inward curved and spring-loaded leaf spring leg of the support element 30A laterally outwards (cf. FIG. 20). As a result, the terminal portion of the leaf spring leg supporting the pivot arm 17' of the blocking member 11' is urged in the transverse direction outwards, whereby the terminal portion, necessarily, releases the pivot arm 17' of the blocking member 11'. Consequently, the blocking member 11' can drop downwards due to its dead weight. The arrangement of the control blade 32 and the seat 20' of the drive slide 5' are positioned such that the blocking member 11' is pivoted upwards and downwards in the same manner as in the case of the embodiment according to FIGS. 1 to 16. Thus, once a displacement of the drive slide 5' relative to the latching structure 12' forcedly urges the blocking member 11' upwards into the latching recess 24', the control blade 32 releases the support element 30A, i.e., the leaf spring leg, whereby said leg here engages under the support arm 17' and secures the blocking member 11' in the latching position within the latching structure 12' according to FIG. 24.

Figure 22:
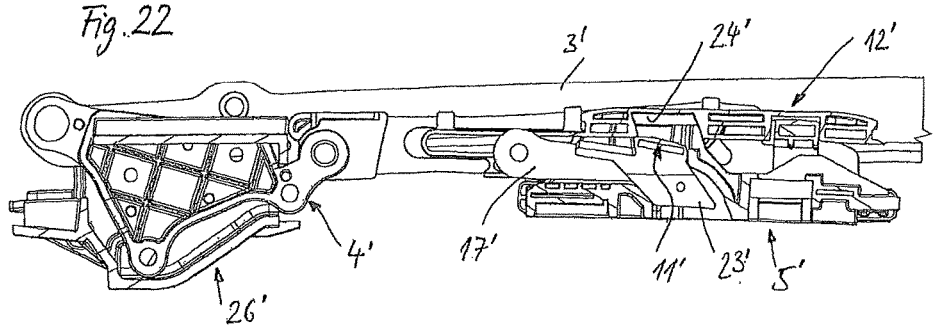
FIGS. 22 to 24 show partial views of longitudinal sections of the drive system according to FIGS. 17 to 21 in different functional positions.
Figure 23:
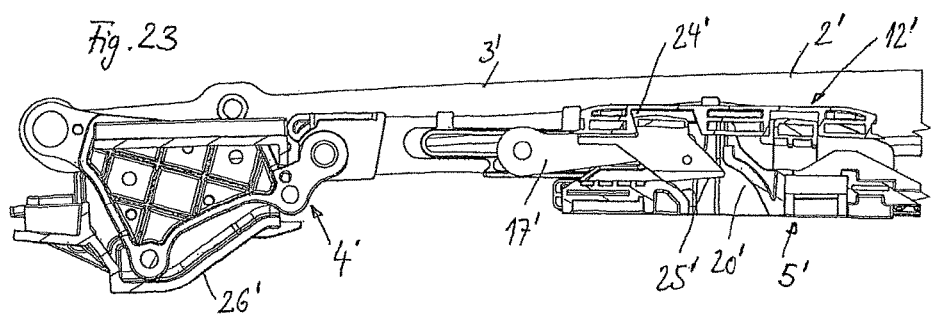
Figure 24:
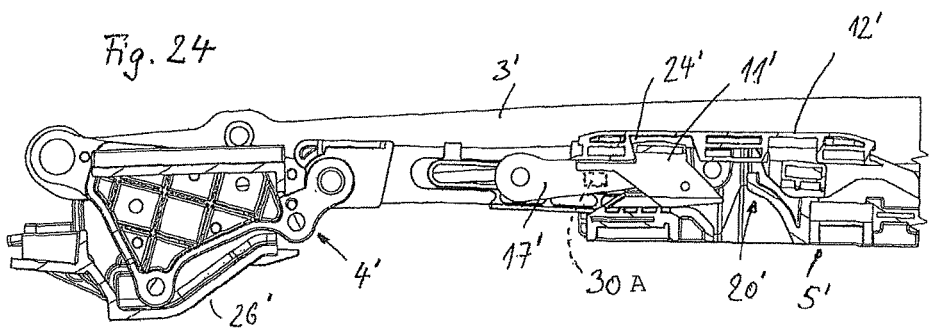

Once the drive slide 5' is shifted from a rearwards displaced functional position back in the direction towards the front-side lifting arrangement 4', the control blade 32 can urge the leaf spring leg again transversely outwards, whereby a lower edge of the blocking member 11' initially rests on a corresponding surface of the drive slide 5', until the drive slide 5' has moved forwards far enough that the blocking member 11' can plunge back downwards into the seat 20' of the drive slide 5' and, thus, the hammer-shaped contour of the blocking member 11' is again released from the latching recess 24' of the latching structure 12' fixed in location, according to FIG. 22.

The invention claimed is:

1. A drive system for a movable roof part of a roof module of a motor vehicle, comprising a guide rail arrangement installed fixed to the roof module in a ready-for-use assembled condition, comprising a drive slide which is lengthwise displaceable along the guide rail arrangement via a drive transmission arrangement, comprising a front-side lifting arrangement and a rear-side deployment mechanism, and comprising a support profile on which support profile the roof part is fixed in the ready-for-use assembled condition, wherein the lifting arrangement and the deployment mechanism interact with the support profile in such a manner that the support profile is forcedly guided between a closed position of the roof part, a ventilation position and an open position of the roof part, and comprising a coupling device to produce a distance-controlled operative connection between the deployment mechanism and the drive slide, wherein the coupling device, on a terminal portion thereof remote from the deployment mechanism, includes a coupling slide guided in the guide rail arrangement, which coupling slide comprises a blocking member movable in a vertical direction, a latching recess fixed in location is provided within the guide rail arrangement, and the drive slide has a seat, wherein the blocking member is forcedly controlled into the latching recess or into the seat by mechanical control contours as a function of a position of the drive slide.

2. The drive system according to claim 1, wherein the blocking member is pivotably mounted on the coupling slide.

3. The drive system according to claim 1, wherein the blocking member has on one side a contour complementary to the latching recess and on an opposite side a seat contour matched to the seat in the drive slide.

4. The drive system according to claim 1, wherein a support element is attached to the coupling slide, which support element is mounted to be movable between a support position securing the blocking member in a latching position and a release position releasing the blocking member for a downwards lowering move.

5. The drive system according to claim 4, wherein the support element is permanently spring-loaded in a direction towards the support position.

6. The drive system according to claim 4, wherein the support element is mounted to be movable in a transverse direction of the guide rail arrangement.

7. The drive system according to claim 4, wherein the drive slide includes a control member which directs the support element, during a relative displacement between the coupling slide and the drive slide, from the support position to the release position.

8. The drive system according to claim 4, wherein the support element is embodied as a leaf spring leg which is clamped on the coupling slide elastically movably such that the leaf spring leg is pivotable in a transverse direction of the guide rail arrangement.

9. The drive system according to claim 4, wherein the support element supports the blocking member in the latching position from below towards the vertical direction and pivots away towards one side for a transfer to the release position.

10. The drive system according to claim 1, wherein the lifting arrangement has a dimensionally stable multi-point support body produced as a one-piece component made of synthetic material, which support body includes two support axes guided in the guide rail arrangement and a point of articulation to which the support profile is articulated on a front side thereof.

11. The drive system according to claim 10, wherein the guide rail arrangement has on a front side thereof a curved section extending between two different levels of height, and one of the two support axes of the support body is positioned at the curved section in the closed position of the roof part.

12. The drive system according to claim 11, wherein the curved section is produced as a separate component and joined to a guide rail profile of the guide rail arrangement.

13. A drive system for a movable roof part of a roof module of a motor vehicle, comprising a guide rail arrangement installed fixed to the roof module in a ready-for-use assembled condition, comprising a drive slide which is lengthwise displaceable along the guide rail arrangement via a drive transmission arrangement, comprising a front-side lifting arrangement and a rear-side deployment mechanism, and comprising a support profile on which support profile the roof part is fixed in the ready-for-use assembled condition, wherein the lifting arrangement and the deployment mechanism interact with the support profile in such a manner that the support profile is forcedly guided between a closed position of the roof part, a ventilation position and an open position of the roof part, and comprising a coupling device to produce a distance-controlled operative connection between the deployment mechanism and the drive slide, wherein the lifting arrangement has a dimensionally stable multi-point support body produced as a one-piece component made of synthetic material, which support body includes two support axes guided in the guide rail arrangement and a point of articulation to which the support profile is articulated on a front side thereof.

* * * * *